US012790965B2

(12) United States Patent
Smith

(10) Patent No.: US 12,790,965 B2
(45) Date of Patent: Nov. 10, 2026

(54) COMBINED CYCLE POWER PLANT HAVING A CARBON CAPTURE SYSTEM WITH A DEDICATED STEAM TURBINE

(71) Applicant: GE Vernova Infrastructure Technology LLC, Greenville, SC (US)

(72) Inventor: Raub Warfield Smith, Schenectady, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/853,656

(22) PCT Filed: Apr. 7, 2022

(86) PCT No.: PCT/US2022/023819
§ 371 (c)(1),
(2) Date: Oct. 2, 2024

(87) PCT Pub. No.: WO2023/195985
PCT Pub. Date: Oct. 12, 2023

(65) Prior Publication Data

US 2025/0223914 A1 Jul. 10, 2025

(51) Int. Cl.

| | |
|---|---|
| ***F01K 23/10*** | (2006.01) |
| ***F01K 7/22*** | (2006.01) |
| ***F01K 17/04*** | (2006.01) |
| ***F02C 6/18*** | (2006.01) |

(52) U.S. Cl.
CPC ................ *F01K 23/10* (2013.01); *F01K 7/22* (2013.01); *F01K 17/04* (2013.01); *F02C 6/18* (2013.01); *F05D 2260/61* (2013.01)

(58) Field of Classification Search
CPC .......... F01K 23/10; F01K 23/106; F01K 7/22; F01K 17/00; F01K 17/04; F02C 6/18
See application file for complete search history.

(56) References Cited

U.S. PATENT DOCUMENTS 5,842,345 A * 12/1998 Scharpf .................. C01B 3/025 423/237
6,220,013 B1 * 4/2001 Smith .................. F01K 23/106 110/212
7,168,233 B1 * 1/2007 Smith .................. F22B 35/007 60/39.182
9,376,962 B2 * 6/2016 Pang ...................... F02C 7/224
9,631,520 B2 * 4/2017 Majumdar ................ F01K 7/16
11,306,636 B2 4/2022 Tsujiuchi et al.
(Continued)

FOREIGN PATENT DOCUMENTS

CN 112922686 A 6/2021
EP 2482958 A1 8/2012
(Continued)

*Primary Examiner* — Alain Chau
(74) *Attorney, Agent, or Firm* — Dority & Manning, P.A.

(57) ABSTRACT

A combined cycle power plant (CCPP) including a gas turbine, a heat recovery steam generator (HRSG), a steam utilization system, and a steam turbine system. The steam turbine system includes at least one of a high pressure steam turbine, an intermediate pressure steam turbine, and a low pressure steam turbine. The steam turbine system further includes a non-condensing steam turbine that has an inlet fluidly coupled to the HRSG and an outlet fluidly coupled to the steam utilization system.

13 Claims, 4 Drawing Sheets

(56) References Cited

U.S. PATENT DOCUMENTS

| | | | | |
|---|---|---|---|---|
| 11,834,968 | B2 * | 12/2023 | Uechi | F01K 23/10 |
| 2009/0151318 | A1 * | 6/2009 | Handagama | B01D 53/62 60/39.182 |
| 2010/0083661 | A1 | 4/2010 | Narayanaswamy et al. | |
| 2011/0056219 | A1 | 3/2011 | Avery et al. | |
| 2012/0227372 | A1 | 9/2012 | Li et al. | |
| 2013/0133594 | A1 | 5/2013 | Wad et al. | |
| 2013/0269346 | A1 * | 10/2013 | Li | F01K 17/04 60/645 |
| 2014/0033676 | A1 | 2/2014 | Pang et al. | |
| 2014/0165572 | A1 * | 6/2014 | Pang | F01K 3/12 60/736 |
| 2014/0283518 | A1 * | 9/2014 | Majumdar | F01K 7/16 60/670 |
| 2016/0033128 | A1 * | 2/2016 | Stuxberg | F01K 7/34 60/692 |
| 2016/0319702 | A1 * | 11/2016 | Martindale | F01K 7/165 |
| 2016/0348540 | A1 * | 12/2016 | Edel | F01K 7/22 |
| 2017/0268383 | A1 * | 9/2017 | Hirayama | F01K 13/02 |
| 2018/0371917 | A1 * | 12/2018 | Nishikawa | F02C 7/16 |
| 2023/0022466 | A1 * | 1/2023 | Uechi | F22D 1/02 |

FOREIGN PATENT DOCUMENTS

| | | | |
|---|---|---|---|
| EP | 3786421 | A1 | 3/2021 |
| JP | 2019190359 | A | 10/2019 |
| WO | WO2019/208416 | A1 | 10/2019 |

* cited by examiner

COMBINED CYCLE POWER PLANT HAVING A CARBON CAPTURE SYSTEM WITH A DEDICATED STEAM TURBINE

FIELD

The present disclosure relates generally to a combined cycle power plant (CCPP) system. Particularly, the disclosure relates to a CCPP system having a dedicated non-condensing steam turbine.

BACKGROUND

A gas turbine power plant such as a combined cycle power plant (CCPP) generally includes a gas turbine having a compressor section, a combustor section, a turbine section, a heat recovery steam generator (HRSG) that is disposed downstream from the turbine and at least one steam turbine in fluid communication with the HRSG. During operation, air enters the compressor via an inlet system and is progressively compressed as it is routed towards a compressor discharge or diffuser casing that at least partially surrounds the combustor. At least a portion of the compressed air is mixed with a fuel and burned within a combustion chamber defined within the combustor, thereby generating high temperature and high pressure combustion gas.

The combustion gas is routed along a hot gas path from the combustor through the turbine where they progressively expand as they flow across alternating stages of stationary vanes and rotatable turbine blades which are coupled to a rotor shaft. Kinetic energy is transferred from the combustion gas to the turbine blades thus causing the rotor shaft to rotate. The rotational energy of the rotor shaft may be converted to electrical energy via a generator. The combustion gas exits the turbine as exhaust gas and the exhaust gas enters the HRSG. Thermal energy from the exhaust gas is transferred to water flowing through one or more heat exchangers of the HRSG, thereby producing superheated steam. The superheated steam is then routed into the steam turbine which may be used to generate additional electricity, thus enhancing overall power plant efficiency.

Turbomachine combustion systems usually burn hydrocarbon fuels and produce air polluting emissions such as oxides of nitrogen (NOx), carbon monoxide (CO), and carbon dioxide ($CO_2$). In an effort to reduce emissions, carbon capture systems (CCS) are utilized to capture the $CO_2$, and other air polluting gases before exhausting the turbomachine gases to the atmosphere. Carbon capture systems often include reboilers to regenerate a solvent that require a reliable, and predictable, flow of steam.

Accordingly, an improved combined cycle power plant capable of supplying a constant flow of steam to a carbon capture system is desired and would be appreciated in the art.

BRIEF DESCRIPTION

Aspects and advantages of the combined cycle power plants in accordance with the present disclosure will be set forth in part in the following description, or may be obvious from the description, or may be learned through practice of the technology.

In accordance with one embodiment, a combined cycle power plant (CCPP) is provided. The CCPP includes a gas turbine, a heat recovery steam generator (HRSG), a carbon capture system, and a steam turbine system. The steam turbine system includes at least one of a high pressure steam turbine, an intermediate pressure steam turbine, and a low pressure steam turbine. The steam turbine system further includes a non-condensing steam turbine that has an inlet fluidly coupled to the HRSG and an outlet fluidly coupled to the carbon capture system.

In accordance with another embodiment, a combined cycle power plant (CCPP) is provided. The CCPP includes a gas turbine, a heat recovery steam generator (HRSG), a carbon capture system, a shaft, and a steam turbine system. The steam turbine system includes a high pressure steam turbine, an intermediate pressure steam turbine, and a low pressure steam turbine disposed on the shaft. The steam turbine system further includes a non-condensing steam turbine that is disposed on the shaft and that has an inlet fluidly coupled to the HRSG and an outlet fluidly coupled to the carbon capture system.

These and other features, aspects and advantages of the present combined cycle power plants will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present combined cycle power plants, including the best mode of making and using the present systems and methods, directed to one of ordinary skill in the art, is set forth in the specification, which makes reference to the appended figures, in which.

DETAILED DESCRIPTION

Figure 1:
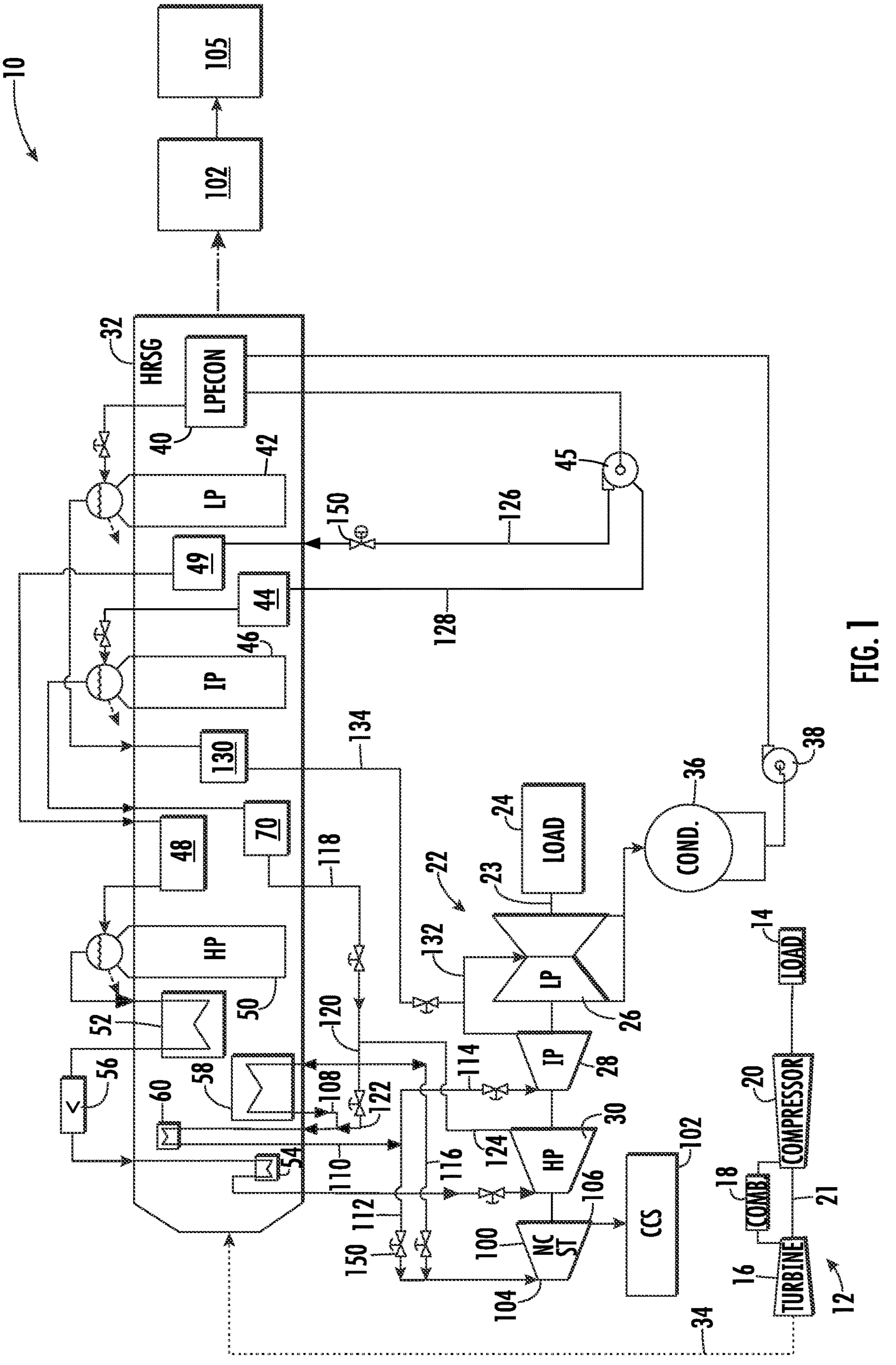
FIG. 1 is a schematic illustration of a combined cycle power plant (CCPP) in accordance with embodiments of the present disclosure.

Reference now will be made in detail to embodiments of the present combined cycle power plants, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, "line" may refer to a pipe, hose, or any other suitable fluid conduit.

FIGS. 1 through 4 are each schematic flow diagrams of an embodiment of a combined cycle power generation system or combined cycle power plant (CCPP) 10 in accordance with embodiments of the present disclosure. The CCPP 10 may include a gas turbine 12 for driving a first load 14. The first load 14 may, for instance, be an electrical generator for producing electrical power. The gas turbine 12 may include a turbine section 16, combustors or a combustion chamber 18, and a compressor section 20. The turbine section 16 and the compressor section may be connected by one or more shafts 21.

During operation of the gas turbine 12, a working fluid such as air flows into the compressor section 20 where the air is progressively compressed, thus providing compressed air to the combustors 18. The compressed air is mixed with fuel and burned within each combustor to produce combustion gases. The combustion gases flow through the hot gas path from the combustors 18 into the turbine section 16, wherein energy (kinetic and/or thermal) is transferred from the combustion gases to the rotor blades, causing the one or more shafts 21 to rotate. The mechanical rotational energy may then be used to power the compressor section 20 and/or to generate electricity. Heated exhaust gas 34 exiting the turbine section 16 may then be exhausted from the gas turbine 12 and into a heat recovery steam generator (HRSG) 32, where a heat transfer takes place between the heated exhaust gas 34 and the various components of the HRSG. The exhaust gas 34 may exit the HRSG and enter a carbon capture system 102 before exiting to the atmosphere via an exhaust stack 105. In some embodiments, the carbon capture system 102 may be disposed aft of the exhaust stack 105. In other embodiments, the carbon capture system 102 may be disposed within the HRSG. The carbon capture system 102 appears in two locations in each of FIGS. 1 through 4; however, this was done for simplicity in the figures, and it should be understood that each box labeled 102 represents the same system (i.e., the carbon capture system).

As used herein, "steam utilization system" may be any system that utilizes steam for the purposes of energy transfer, such as but not limited to heat recovery units (such as reboilers, condensers, coolers, or heaters) or power units (such as turbines or pumps). In exemplary embodiments, the steam utilization system may be a carbon capture system 102.

The carbon capture system 102 may be configured to remove pollutants (such as $CO_2$) from the exhaust gas 34 before it is exhausted to the atmosphere. For example, the carbon capture system 102 may a specialized chemical agent which has an engineered affinity to carbon (such as a liquid solvent or solid sorbent). Once the $CO_2$ and the agent bond. the $CO_2$ and agent are processed, and the $CO_2$ may be separated and taken to a compression tank as pure $CO_2$. This $CO_2$ may then be transported to a geologic formation deep underground or re-used in industrial process.

In various embodiments, the carbon capture system 102 may include one or more heat exchangers (e.g., heat recovery units such as reboilers, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), gas separation systems, gas purification systems, and/or a solvent based treatment system, exhaust gas compressors, any combination thereof. These subsystems of the carbon capture system 102 enable control of the temperature, pressure, flow rate, moisture content (e.g., amount of water removal), particulate content (e.g., amount of particulate removal), and gas composition (e.g., concentration of CO2, N2, etc.). In various embodiments, the carbon capture system 102 (and/or one or more subcomponents of the carbon capture system 102) may require an input of steam at a consistent (e.g., not fluctuation or varying) temperature and pressure.

The CCPP 10 may also include a steam turbine system 22 for driving a second load 24. The second load 24 may also be an electrical generator for generating electrical power. However, both the first and second loads 14, 24 may be other types of loads capable of being driven by the gas turbine 12 and steam turbine system 22. In addition, although the gas turbine 12 and steam turbine system 22 may drive separate loads 14 and 24, as shown in the illustrated embodiment, the gas turbine 12 and steam turbine system 22 may also be utilized in tandem to drive a single load via a single shaft. In the illustrated embodiment, the steam turbine system 22 may include one low pressure steam turbine 26 (LP), one intermediate pressure steam turbine 28 (IP), and one high pressure steam turbine 30 (HP). The low pressure steam turbine 26 (LP), the intermediate pressure steam turbine 28 (IP), the high pressure steam turbine 30, and the load 24 may each be disposed on one or more shafts 23 (such as a common shaft in some embodiments). In other embodiments, the low pressure steam turbine 26 (LP), the intermediate pressure steam turbine 28 (IP), and the high pressure steam turbine 30 may be disposed on separate shafts (which may be coupled to one another). in some embodiments, the low pressure steam turbine 26 and the intermediate pressure steam turbine 28 may be disposed on a common shaft of the one or more shafts to form an LP/IP steam turbine, while the HP steam turbine 30 may be on a separate shaft or not included in the system.

In exemplary embodiments, the steam turbine system 22 may include a non-condensing steam turbine 100. As shown, the non-condensing steam turbine 100 may be disposed on the one or more shafts 23 (which may be a common shaft to all the steam turbines or may be a separate shaft). For example, in some embodiments, the non-condensing steam turbine 100 may be disposed on an independent, separately rotating shaft, from the low pressure steam turbine 26 (LP), the intermediate pressure steam turbine 28 (IP), the high pressure steam turbine 30. In other embodiments, the non-condensing steam turbine 100 may be disposed on a common shaft with one or more of the low pressure steam turbine 26 (LP), the intermediate pressure steam turbine 28 (IP), the high pressure steam turbine 30. The non-condensing steam turbine 100 may have an inlet 104 an inlet fluidly coupled to the HRSG 32 and an outlet 106 fluidly coupled to the carbon capture system 102. The non-condensing steam turbine 100 may not condense the steam with which it is powered (e.g., it may receive steam at the inlet 104 and exhaust steam at the outlet 106). The non-condensing steam turbine 100 may advantageously assist in rotating the shaft 23 attached to the load 24, thereby generating electrical power, while providing a set output of steam at the outlet 106 which may be supplied to the carbon capture system 102. For example, the steam from the outlet 106 may be supplied to the carbon capture system 102 at a consistent temperature and pressure, which may be advantageous when operating one or more boilers, heat exchangers, or other components of the carbon capture system 102.

The CCPP 10 may also include an HRSG 32 having multiple stages. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 12 may be transported into the HRSG 32 and used to heat steam used to power the steam turbine system 22. Exhaust from the low pressure steam turbine 26 of the steam turbine system 22 may be directed into a condenser 36. Condensate from the condenser 36 may, in turn, be directed into a low pressure section of the HRSG 32 with the aid of a condensate pump 38.

The condensate may then flow through a low pressure economizer 40 (LPECON), which may be used to heat the condensate. From the low pressure economizer 40, the condensate (e.g., water) may either be directed into a low pressure evaporator 42 (LPEVAP) or toward an intermediate pressure economizer 44 (IPECON) with the aid of a feedwater pump 45. From the feedwater pump 45, the condensate may flow into either the IPECON 44 or an HP economizer 49, e.g., via two separate pipes, tubes, or fluid conduits. For example, a first feedwater line 126 may extend from the feedwater pump 45 to the HP economizer 49, and the second feedwater line 128 may extend from the feedwater pump 45 to the IPECON 44. From the intermediate pressure economizer 44, the condensate may be directed into an intermediate pressure evaporator 46 (IPEVAP). Additionally, from the HP economizer 49, the condensate may flow into a high pressure economizer 48 (HPECON). In some embodiments, the HPECON 48 may be referred to as a first high pressure economizer, and the economizer 49 may be referred to as a second high pressure economizer.

In many embodiments, the CCPP 10 may further include a low pressure superheater 130 disposed within the HRSG 32. The low pressure superheater 130 may be a heat exchanger that transfers heat between the steam traveling therethrough and the exhaust gas 34 traveling through the HRSG 32. The low pressure superheater 130 may receive steam from the LPEVAP 42 (and subsequently superheat said steam). Steam from the low pressure superheater 130, along with steam from the exhaust of the intermediate pressure steam turbine 28, may mix together and be supplied to the low pressure steam turbine 26. For example, a connection line 132 may fluidly couple the outlet of the intermediate pressure steam turbine 28 to an inlet of the low pressure steam turbine 26. An outlet line 134 extend from the low pressure superheater 130 to the connection line 132, thereby fluidly coupling the low pressure superheater 130 to the connection line 132. Note that while FIGS. 1-4 each depict a steam turbine system 22 with separate IP and LP turbine casings connected by a crossover pipe, it should be appreciated that a steam turbine system may combine a single IP/LP turbine casing (with provision for an interstage admission for LP steam) without departing from the scope and/or spirit of the present disclosure.

Figure 2:
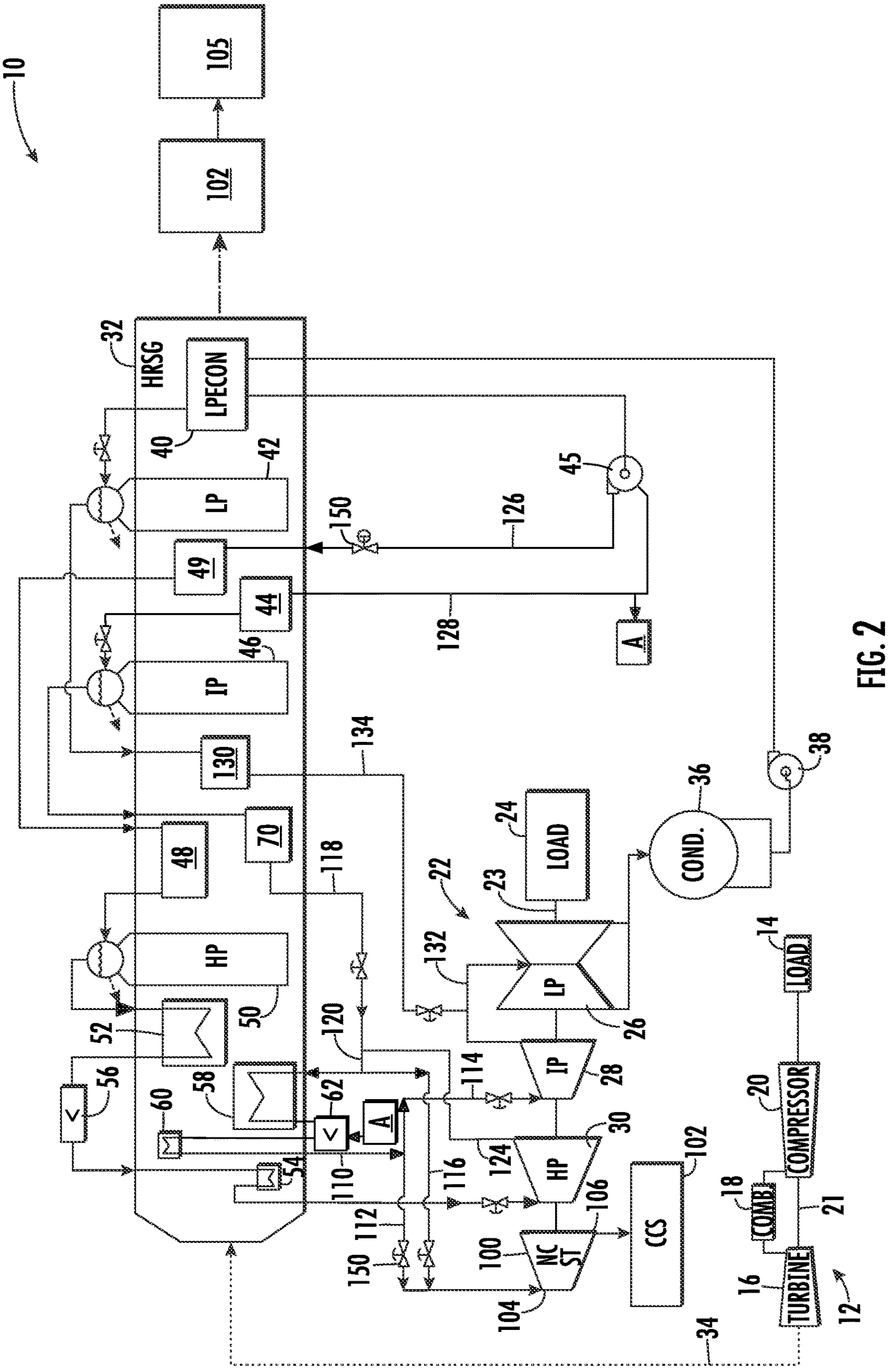
FIG. 2 is a schematic illustration of a combined cycle power plant (CCPP) in accordance with embodiments of the present disclosure.
Figure 3:
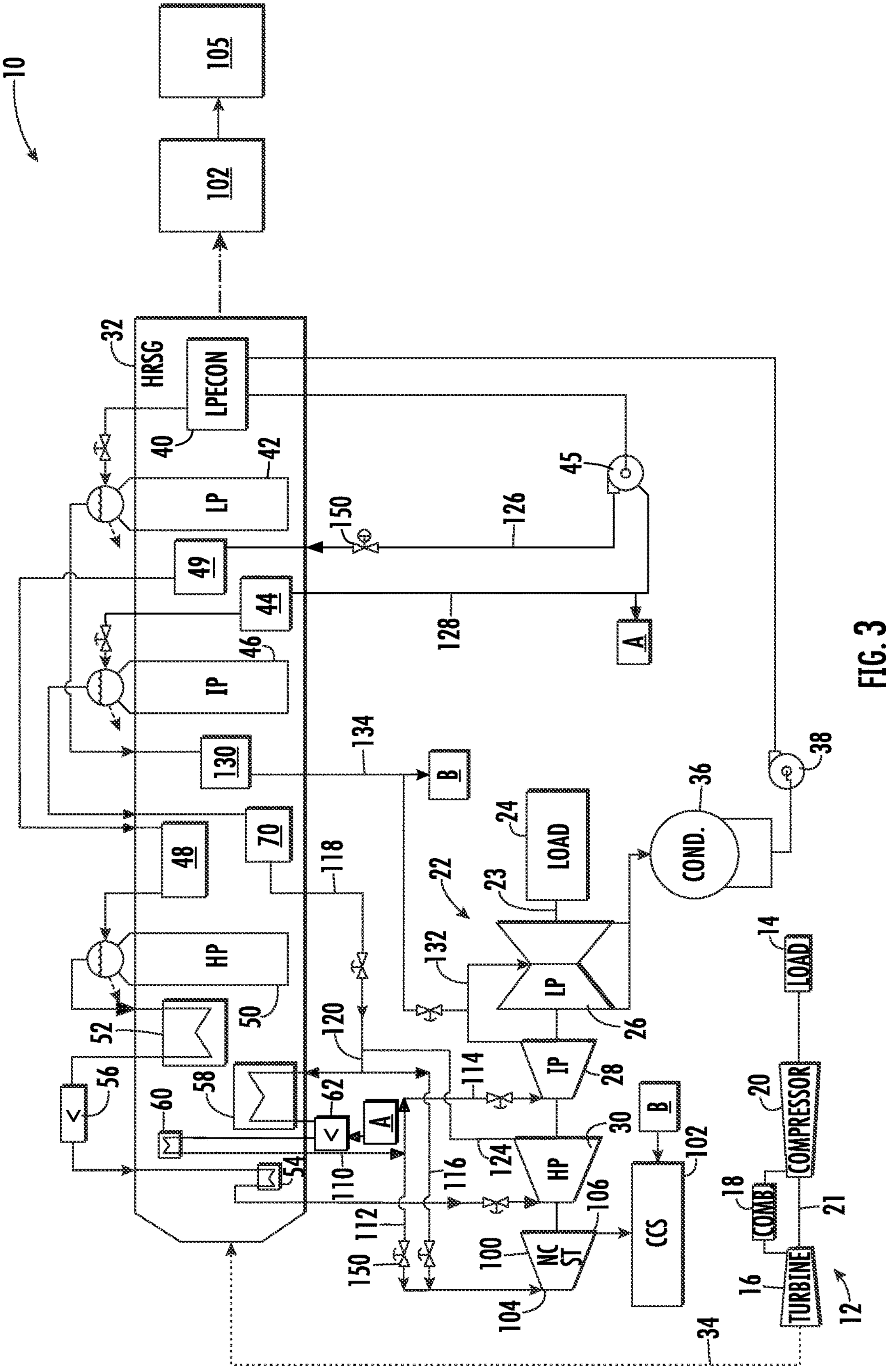
FIG. 3 is a schematic illustration of a combined cycle power plant (CCPP) in accordance with embodiments of the present disclosure.
Figure 4:
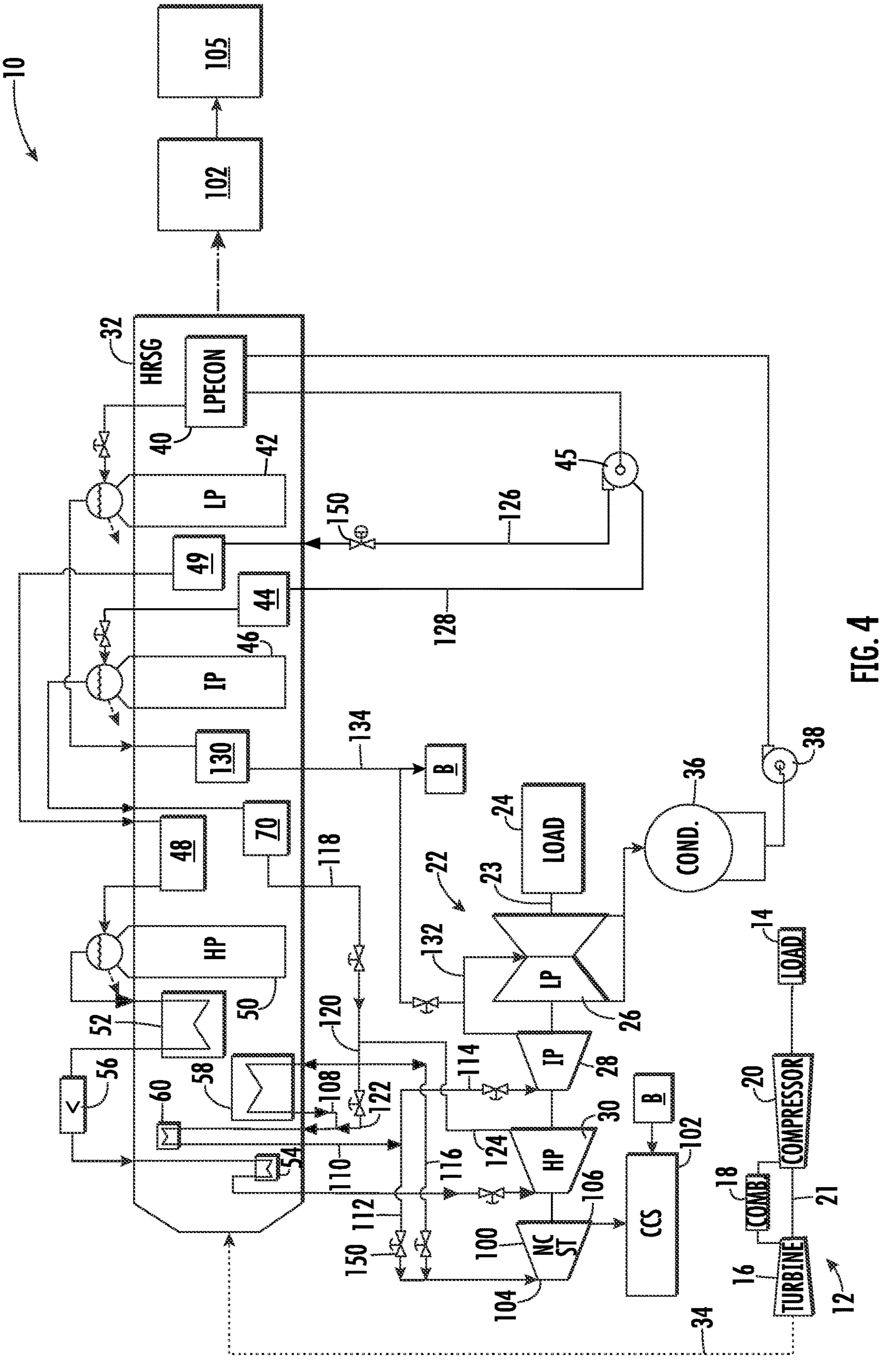
FIG. 4 is a schematic illustration of a combined cycle power plant (CCPP) in accordance with embodiments of the present disclosure.

Similarly, the CCPP 10 may further include an intermediate pressure superheater 70 disposed within the HRSG 32. The intermediate pressure superheater 70 may be a heat exchanger that transfers heat between the steam traveling therethrough and the exhaust gas 34 traveling through the HRSG 32. The intermediate pressure superheater 70 may receive steam from the IPEVAP 46 (and subsequently superheat said steam). In some embodiments, as shown in FIGS. 1 and 4, the intermediate pressure superheater 70 may be disposed within the HRSG 32 upstream (e.g., immediately or directly upstream) of the low pressure superheater 130 with respect to the flow of heated exhaust gas 34 through the HRSG 32. Steam from the intermediate pressure superheater 70, along with steam from the exhaust of the high pressure steam turbine 30, may mix together and be supplied to one or more of the non-condensing steam turbine 100, the primary reheater 58, and/or the finishing reheater 60. For example, an outlet line 118 may extend from the intermediate pressure superheater 70 to a junction with a high pressure outlet line 124 of the high pressure steam turbine 30. At the junction, the steam from the intermediate pressure superheater 70 and the steam from the high pressure steam turbine 30 may mix together and enter the main supply line 120. The main supply line 120 may then branch in at least two directions and supply the mixed steam to one or more of the primary reheater 58, the second supply line 116, and/or the bypass line 122. For example, in the embodiments shown in FIGS. 1 and 4, the main supply line 120 may branch in three directions to supply steam to the primary reheater 58, the second supply line 116, and the bypass line 122. Alternatively, as shown in FIGS. 2 and 3, the main supply line 120 may branch in two directions to supply steam to the primary reheater 58 and the second supply line 116.

Each of the economizers (e.g., the LPECON 40, IPECON 44, HPECON 49, and HPECON 48) described herein may be devices configured to heat feedwater or condensate, with heated exhaust gas 34. In this way, the LPECON 40, IPECON 44, HPECON 49, and HPECON 48 may be heat exchangers that transfer heat between the water used for the steam turbine system 22 and the heated exhaust gas 34 from the gas turbine 12.

Finally, condensate from the high pressure economizer 48 may be directed into a high pressure evaporator 50 (HPEVAP). Steam exiting the high pressure evaporator 50 may be directed into a primary high pressure superheater 52 and a finishing high pressure superheater 54, where the steam is superheated and eventually sent to the high pressure steam turbine 30 of the steam turbine system 22. The superheaters 52, 54 may each be heat exchangers that transfer heat from the heated exhaust gas 34 from the gas turbine 12 traveling through the HRSG 32 to the steam used for the steam turbine system 22 and.

An inter-stage attemperator 56 may be located in between the primary high pressure superheater 52 and the finishing high pressure superheater 54. The inter-stage attemperator 56 may allow for more robust control of the discharge temperature of steam from the finishing high pressure superheater 54. Specifically, the inter-stage attemperator 56 may be configured to control the temperature of steam exiting the finishing high pressure superheater 54 by injecting cooler feedwater spray into the superheated steam upstream of the finishing high pressure superheater 54 whenever the discharge temperature of the steam exiting the finishing high pressure superheater 54 exceeds a predetermined value.

In addition, exhaust from the high pressure steam turbine 30 of the steam turbine system 22 may be mixed with intermediate pressure steam exiting the intermediate pressure superheater 70 and together directed into a primary reheater 58 and a finishing reheater 60 where it may be re-heated before being directed into the intermediate pressure steam turbine 28 and/or the non-condensing steam turbine 100 of the steam turbine system 22. The primary reheater 58 may be fluidly coupled to the finishing reheater 60 via a reheater connection line 108 (FIGS. 1 and 4). The reheater connection line 108 may extend between, and fluidly couple, the primary reheater 58 to the finishing reheater 60.

In combined cycle systems such as CCPP 10, hot exhaust may flow from the gas turbine 12 is directed through the HRSG 32 and may be used to generate high pressure, high-temperature steam, as well as steam at one or more lower pressures and temperatures. The steam produced by the HRSG 32 may then be passed through the steam turbine system 22 for power generation. In addition, the produced steam may also be supplied to any other processes where steam may be used.

The gas turbine 12 generation cycle is often referred to as the "topping cycle," whereas the HRSG 32 and steam turbine system 22 generation cycle is often referred to as the "bottoming cycle." By combining these two cycles as illustrated in FIGS. 1 through 4, the combined cycle power plant 10 may lead to greater combined plant efficiency. In particular, exhaust heat from the topping cycle may be captured and used to generate steam for use in the bottoming cycle.

The CCPP 10 advantageously recaptures heat from the heated exhaust gas 34 by using the HRSG 32. As illustrated in FIG. 1, components of the gas turbine 12 and the HRSG 32 may be separated into discrete functional units. In other words, the gas turbine 12 may generate the heated exhaust gas 34 and direct the heated exhaust gas 34 toward the HRSG 32, which may be primarily responsible for recapturing the heat from the heated exhaust gas 34 by generating superheated steam. In turn, the superheated steam may be used by the steam turbine system 22 as a source of power. The heated exhaust gas 34 may be transferred to the HRSG 32 through a series of ductwork, which may vary based on the particular design of the CCPP 10.

In exemplary embodiments, the inlet 104 of the non-condensing steam turbine 100 may be fluidly coupled to the finishing reheater 60 at least partially via an outlet line 110 of the finishing reheater 60. For example, in many embodiments, steam from the finishing reheater 60 may be supplied to both the non-condensing steam turbine 100 and the intermediate pressure steam turbine 28 at least partially via the outlet line 110. Particularly, a first supply line 112 may extend from the outlet line 110 to the non-condensing steam turbine 100 (to feed steam from the finishing reheater 60 to the non-condensing steam turbine 100), and an intermediate pressure supply line 114 may extend from the outlet line 110 to the intermediate pressure steam turbine 28 (to feed steam from the finishing reheater 60 to the intermediate pressure steam turbine 28). For example, the first supply line 112 and the intermediate pressure supply line 114 may branch off from the outlet line 110 to different locations. Particularly, the first supply line 112 may extend from the outlet line 110 of the finishing reheater 60 to the inlet 104 of the non-condensing steam turbine 100 of the steam turbine system 22. The intermediate pressure supply line 114 may extend from the outlet line 110 to the intermediate pressure steam turbine 28 of the steam turbine system 22. In this way, the finishing reheater 60 may supply steam to both the non-condensing steam turbine 100 and the intermediate pressure steam turbine 28.

In many embodiments, a second supply line 116 may extend from the main supply line 120 of the HRSG 32 to the first supply line 112. For example, the intermediate pressure superheater 70 may include an outlet line 118 in fluid communication with the primary reheater 58 and the non-condensing steam turbine 100. A primary reheater supply line 120 may extend from the outlet line 118 to the primary reheater 58. Similarly, the second supply line 116 may extend from the main supply line 120 to the first supply line 112. In this way, the inlet 104 of the non-condensing steam turbine 100 may receive a mixture of fluids (e.g., steam) from the main supply line 120 (which includes a sub-mixture of steam from the intermediate pressure superheater 70 and steam from the outlet of the high pressure steam turbine 30) and steam from the outlet of the finishing reheater 60. This advantageously allows management of the steam temperature at the inlet 104 and outlet 106 of the non-condensing steam turbine 100, which is used to feed the carbon capture system 102, thereby greatly reducing or eliminating the need for an attemperator between the outlet 106 and the carbon capture system 102.

In some embodiments, as shown in FIG. 1 and FIG. 4, a bypass line 122 may fluidly connect to the connection line 108 between the primary reheater and finishing reheater 60 (or at the inlet of the finishing reheater 60). For example, the bypass line 122 may extend between the main supply line 120 and the reheater connection line 108. In this way, the main supply line 120 may branch in three directions (at a branch point), e.g., into the primary reheater 58, the second supply line 116 feeding the non-condensing steam turbine 100, and the reheat steam temperature control bypass line 122 (FIG. 1 and FIG. 4). Exhaust from the high pressure steam turbine 30 of the steam turbine system 22 may be supplied to the main supply line 120 upstream of the branch point. For example, a high pressure outlet line 124 may extend between, and fluidly connect, an outlet of the high pressure steam turbine 30 and the outlet line 118 of the intermediate pressure superheater 70.

In various embodiments, as shown in FIGS. 2 and 3, the primary reheater 58 and finishing reheater 60 may also be associated with an inter-stage attemperator 62 for controlling the discharge steam temperature from the reheaters. Specifically, the inter-stage attemperator 62 may be configured to control the temperature of steam exiting the finishing reheater 60 by injecting cooler feedwater spray into the superheated steam upstream of the finishing reheater 60 whenever the discharge temperature of the steam exiting the finishing reheater 60 exceeds a predetermined value. For example, the inter-stage attemperator 62 may be disposed in fluid communication on the reheater connection line (e.g., between the primary reheater 58 and the finishing reheater 60). The inter-stage attemperator 62 may be fluidly coupled to the feedwater pump 45. Particularly, the inter-stage attemperator 62 may receive a portion of the water or condensate exiting the feedwater pump 45. For example, as shown, the inter-stage attemperator 62 may receive a flow of water or condensate from the second feedwater line 128 (as illustrated by the box labeled A in FIG. 2 and FIG. 3). It should be appreciated that the water used for the reheat steam temperature control (i.e., the water received by the inter-stage attemperator 62 from box A) may come from anywhere on the intermediate pressure feedwater circuit, including but not limited to the IPECON discharge into the intermediate pressure drum.

FIGS. 1 through 4 each illustrate a number of valves 150, which are not individually numbered but are illustrated with a common symbol in FIGS. 1 through 4. Each of the valves 150 may be selectively actuated between an open position and a closed position. In an open position, fluid traveling through the line to which the valve 150 is attached may be unrestricted. By contrast, in a closed position, fluid traveling through the line to which the valve 150 is attached may be restricted. Each of the valves may also be selectively actuated to a partially closed (or partially open) position, which may allow the valve 150 to control a flow rate of the fluid traveling through the line to which the valve 150 is attached.

In various embodiments, the carbon capture system 102 may be fluidly coupled to the low pressure superheater 130 (as illustrated by box B in FIGS. 3 and 4). For example, a portion of the steam exiting the low pressure superheater 130 may be sent to the carbon capture system 102 (e.g., from the outlet line 134). It should be appreciated that the box B represents a line extending from the outlet line 134 to the CCS 102. The steam temperature exiting the low pressure superheater 130 is relatively flat (e.g., unchanging or consistent) across the load range. For example, the temperature of the steam exiting the low pressure superheater 130 may be within ±30% across the load range, or within ±20% across the load range, or within ±10% across the load range, or within ±5% across the load range). This may be advantageous to dedicate steam from the low pressure superheater 130 support needs of the carbon capture system 102, thereby reducing the steam flow required from the non-condensing steam turbine 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A combined cycle power plant (CCPP) comprising: a gas turbine; a heat recovery steam generator (HRSG); a steam utilization system; and a steam turbine system comprising: at least one of a high pressure steam turbine, an intermediate pressure steam turbine, and a low pressure steam turbine; and a non-condensing steam turbine having an inlet fluidly coupled to the HRSG and an outlet fluidly coupled to the steam utilization system.

The CCPP as in any of the preceding clauses, wherein the HRSG further comprises a primary reheater fluidly coupled to a finishing reheater via a reheater connection line.

The CCPP as in any of the preceding clauses, wherein the inlet of the non-condensing steam turbine is fluidly coupled to the finishing reheater at least partially via an outlet line of the finishing reheater.

The CCPP as in any of the preceding clauses, wherein a first supply line extends from the outlet line of the finishing reheater to the inlet of the non-condensing steam turbine.

The CCPP as in any of the preceding clauses, wherein an intermediate pressure supply line extends from the outlet line of the finishing reheater to the intermediate pressure steam turbine.

The CCPP as in any of the preceding clauses, wherein the HRSG includes a superheater having a first outlet line that extends to a main supply line.

The CCPP as in any of the preceding clauses, wherein the high pressure steam turbine includes a second outlet line that extends to the main supply line.

The CCPP as in any of the preceding clauses, wherein a bypass line extends from the main intermediate pressure supply line to the reheater connection line.

The CCPP as in any of the preceding clauses, wherein the steam utilization system is fluidly coupled to a low pressure superheater.

The CCPP as in any of the preceding clauses, wherein the steam utilization system is a carbon capture system.

A combined cycle power plant (CCPP) comprising: a gas turbine; a heat recovery steam generator (HRSG); a steam utilization system; and a steam turbine system comprising: one or more shafts; a high pressure steam turbine, an intermediate pressure steam turbine, and a low pressure steam turbine disposed on the one or more shafts; and a non-condensing steam turbine disposed on the one or more shafts and having an inlet fluidly coupled to the HRSG and an outlet fluidly coupled to the steam utilization system.

The CCPP as in any of the preceding clauses, wherein the HRSG further comprises a primary reheater fluidly coupled to a finishing reheater via a reheater connection line.

The CCPP as in any of the preceding clauses, wherein the inlet of the non-condensing steam turbine is fluidly coupled to the finishing reheater at least partially via an outlet line of the finishing reheater.

The CCPP as in any of the preceding clauses, wherein a first supply line extends from the outlet line of the finishing reheater to the inlet of the non-condensing steam turbine.

The CCPP as in any of the preceding clauses, wherein an intermediate pressure supply line extends from the outlet line of the finishing reheater to the intermediate pressure steam turbine.

The CCPP as in any of the preceding clauses, wherein the HRSG includes a superheater having a first outlet line that extends to a main supply line.

The CCPP as in any of the preceding clauses, wherein the high pressure steam turbine includes a second outlet line that extends to the main supply line.

The CCPP as in any of the preceding clauses, wherein a bypass line extends from the main intermediate pressure supply line to the reheater connection line.

The CCPP as in any of the preceding clauses, wherein the steam utilization system is fluidly coupled to a low pressure superheater.

The CCPP as in any of the preceding clauses, wherein the steam utilization system is a carbon capture system.

What is claimed is:

1. A combined cycle power plant (CCPP) comprising:
a gas turbine;
a heat recovery steam generator (HRSG) having a superheater, a primary reheater, and a finishing reheater, wherein the primary reheater is fluidly coupled to the finishing reheater via a reheater connection line;
a steam utilization system; and
a steam turbine system comprising:
at least one of a high pressure steam turbine, an intermediate pressure steam turbine, and a low pressure steam turbine; and
a non-condensing steam turbine having an inlet fluidly coupled to the HRSG and an outlet directly fluidly coupled to the steam utilization system, wherein the non-condensing steam turbine is configured to receive steam from a first supply line and a second supply line, wherein a bypass line extends to the reheater connection line from a main supply line that is fluidly connected to the high pressure steam turbine and the superheater, wherein the main supply line includes a first branch fluidly coupled to the second supply line and a second branch coupled to the primary reheater, and wherein the finishing reheater is fluidly connected to the first supply line via an outlet line.

2. The CCPP as in claim 1, wherein the first supply line and an intermediate pressure supply line extends from the outlet line of the finishing reheater to the intermediate pressure steam turbine.

3. The CCPP as in claim 1, wherein the HRSG includes the superheater having a first outlet line that extends to the main supply line.

4. The CCPP as in claim 3, wherein the high pressure steam turbine includes a second outlet line that extends to the main supply line.

5. The CCPP as in claim 1, wherein the superheater is an intermediate pressure superheater, and wherein the steam utilization system is fluidly coupled to a low pressure superheater positioned downstream of the intermediate pressure superheater with respect to a flow of exhaust gases in the HRSG.

6. The CCPP as in claim 1, wherein the steam utilization system is a carbon capture system.

7. The CCPP as in claim 1, wherein the high pressure steam turbine, the intermediate pressure steam turbine, the low pressure steam turbine, and the non-condensing steam turbine are disposed on a common shaft.

8. The CCPP as in claim 1, wherein the superheater is an intermediate pressure superheater, wherein a first outlet line extends from the intermediate pressure superheater to the main supply line, wherein a second outlet line extends from the high pressure steam turbine to the main supply line, wherein a third outlet line extends from the finishing reheater to the first supply line.

9. A combined cycle power plant (CCPP) comprising:
a gas turbine;
a heat recovery steam generator (HRSG) having a superheater, a primary reheater, and a finishing reheater, wherein the primary reheater is fluidly coupled to the finishing reheater via a reheater connection line;
a steam utilization system; and
a steam turbine system comprising:
one or more shafts;
a high pressure steam turbine, an intermediate pressure steam turbine, and a low pressure steam turbine disposed on the one or more shafts; and
a non-condensing steam turbine disposed on the one or more shafts and having an inlet fluidly coupled to the HRSG and an outlet directly fluidly coupled to the steam utilization system, wherein the non-condensing steam turbine is configured to receive steam from a first supply line and a second supply line, wherein a bypass line extends to the reheater connection line from a main supply line that is fluidly connected to the high pressure steam turbine and the superheater, wherein the main supply line includes a first branch fluidly coupled to the second supply line and a second branch coupled to the primary reheater, and wherein the finishing reheater is fluidly connected to the first supply line via an outlet line.

10. The CCPP as in claim 9, wherein an intermediate pressure supply line extends from the outlet line of the finishing reheater to the intermediate pressure steam turbine.

11. The CCPP as in claim 9, wherein the HRSG includes the superheater having a first outlet line that extends to the main supply line.

12. The CCPP as in claim 11, wherein the high pressure steam turbine includes a second outlet line that extends to the main supply line.

13. The CCPP as in claim 9, wherein the steam utilization system is fluidly coupled to a low pressure superheater.

* * * * *